United States Patent
Islam et al.

(10) Patent No.: US 7,519,964 B1
(45) Date of Patent: Apr. 14, 2009

(54) SYSTEM AND METHOD FOR APPLICATION DEPLOYMENT IN A DOMAIN FOR A CLUSTER

(75) Inventors: Akm N. Islam, Fremont, CA (US); Micheal C. Hulton, Sunnyvale, CA (US); W. Byron Nevons, Jr., Pacifica, CA (US); Kenneth Ebbs, Los Altos, CA (US); Sridatta Viswanath, San Jose, CA (US); Abhijit Kumar, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 921 days.

(21) Appl. No.: 10/726,447

(22) Filed: Dec. 3, 2003

(51) Int. Cl.
*G06F 9/44* (2006.01)
*G06F 9/46* (2006.01)

(52) U.S. Cl. .................. 717/177; 718/105
(58) Field of Classification Search .............. 717/140, 717/170, 175, 177
See application file for complete search history.

(56) References Cited

U.S. PATENT DOCUMENTS 7,206,817 B2 * 4/2007 Fanshier et al. ............ 709/208
2004/0254984 A1 * 12/2004 Dinker ....................... 709/205

OTHER PUBLICATIONS

Rahul Tyagi, "A Brief Review of the EJB 2.1 Specification,"http://builder.com.com/5100-6386_14-1049431-1-1.html, Sep. 16, 2002, (3 pages).
"BEA WebLogic Server™ and BEA WebLogic Express™: Programming WebLogic JTA," Jun. 24, 2002, (94 pages).
"WebSphere Commerce V5.5 Handbook Customization and Deployment Guide." IBM, Nov. 2003, (pp. 109-132).

* cited by examiner

*Primary Examiner*—Eric B Kiss
(74) *Attorney, Agent, or Firm*—Robert C. Kowert; Meyertons, Hood, Kivlin, Kowert & Goetzel, P.C.

(57) ABSTRACT

A system and method for application deployment in a server cluster from a central domain. The method may include assembling a set of source code and related resource files on an administration server coupled to an application repository. The method may also include compiling the set of source code and related resource files into an application and storing the application in the application repository. The application may then be deployed onto a first subset of servers in a cluster of servers and executed on the subset of servers. In one embodiment, the method may further include storing a different version of the application in the application repository and deploying the different version of the application onto a second subset of servers separate from the first subset of servers. The different version of the application may then be executed on the second subset of servers.

12 Claims, 10 Drawing Sheets

SYSTEM AND METHOD FOR APPLICATION DEPLOYMENT IN A DOMAIN FOR A CLUSTER

BACKGROUND OF THE INVENTION

1. Field of the Invention

This invention relates to the field of clustered computer systems and, more particularly, to deploying applications on clustered computer systems.

2. Description of the Related Art

As web-based applications become more important to business and industry, system failure becomes more expensive, and highly reliable systems assume a greater importance. For example, a web site may handle financial, production, sales, marketing or media applications. Failure to provide these applications to clients for even a few minutes could mean thousands or millions of dollars in lost income.

One way to provide applications on a highly reliable basis is a distributed system with a plurality of redundant components. In a distributed system, a plurality of servers may be connected by a load balancer and a network. In some embodiments, servers may be grouped into one or more clusters of servers. Each cluster may be operable to execute an instance, or copy, of the same application on one or more servers. The load balancer may be operable to serve requests to each instance of the application so that each server has approximately the same overall workload.

One or more servers may execute on a single computer system, or node, in a distributed system. Furthermore, different nodes in a distributed system may be of different architectures. For example, a cluster may be comprised of both Solaris and Linux nodes. In addition, different servers executing on the same node may be part of different clusters.

Traditional management of configuration for software, hardware, and server clustering may rely on repeated manual operations, each of which may or may not require subtle changes. For example, each instance of an application on a cluster may need to be individually compiled, deployed and verified for each server, although each application instances may be substantially similar. In one example, a minor change made between the compilation of different instances may make a major differences between the instances themselves, thereby breaking compatibility between instances.

In addition, small changes may need to be made between different hardware or software deployments. For example, two instances of an application executing on two different servers which in turn execute on the same node may not be able to share the same network port parameter. In a large distributed system the network port parameters in hundreds of configuration files may need to be manually changed. However, manually accessing and modifying hundreds of configuration files may prove both time-consuming and error-prone.

SUMMARY

A system and method for application deployment in a domain for one or more clusters is disclosed. The method may include assembling a set of source code and related resource files on a domain administration server coupled to an application repository. The method may also include compiling the set of source code and related resource files into an application and storing the application in the application repository. The application may then be deployed onto a first subset of servers in a cluster of servers and executed on the subset of servers. In one embodiment, the method may further include storing an different version of the application in the application repository and deploying the different version of the application onto a second subset of servers separate from the first subset of servers. The different version of the application may then be executed on the second subset of servers.

Figure 1:
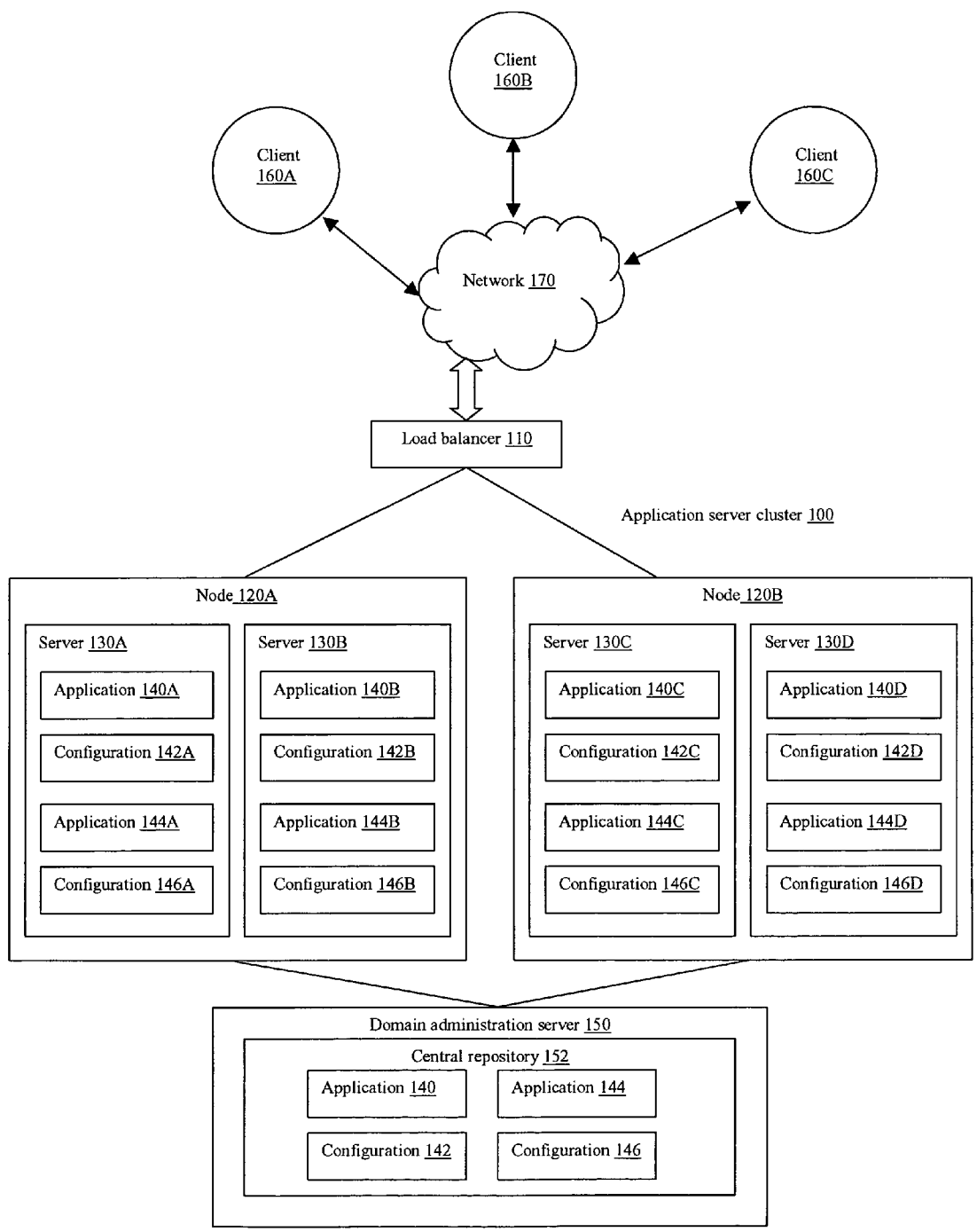
FIG. 1 is a block diagram of a distributed system, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 illustrates a block diagram of an exemplary application server cluster 100. Application server cluster 100 contains a load balancer 110, which is coupled to a plurality of nodes 120A-B, each of which includes one or more servers 130A-D. Load balancer 110 is also coupled to clients 160A-C via network 170, and each server 130A-D is also coupled to domain administration server 150.

Network 170 may be a local area network (LAN), a wide area network (WAN), the Internet, system backplane(s), other type of communication medium, or a combination thereof. Network 170 may be operable to transmit requests for various application services from clients 160A-C to application server cluster 100, and to transmit application responses from application server cluster 100 to clients 160A-C.

Load balancer 110 is operable to receive requests from clients 160A-C. Load balancer 110 may be operable to forward the requests in a balanced manner to servers 130A-D, so that each instance of a given application on servers 130A-D receives approximately the same overall workload and/or number of requests. Load balancer 110 may further be operable to receive responses generated by servers 130A-D, and forward these responses back to the appropriate clients 160A-C.

Each node 120A-B may be a separate hardware system with one or more independent processors, memory, network interfaces and power supplies, as will be described below. Each node 120A-B may be operable to execute one or more software servers 130A-D. In one embodiment, servers 130A-D may be operable to provide an execution environment for various application components, as will be described further below.

Each server 130A-C may contain a copy of application components 140A-D, and 144A-D, and of their respective configuration files 142A-D and 146A-D. Each server 130A-C may be operable to provide an execution environment for application components 140A-D and 144A-D, according to the configuration expressed in configuration files 142A-D and 146A-D, as will be described below.

Application components 140A-D and 144A-D may include Java Beans or any other kind of application component. In various embodiments, each application component 140A-D or 144A-D may be operable to provide e-commerce, database access, remote configuration, or any other kind of network or web-based application functionality. Configuration files 142A-D and 146A-D may contain various information related to the operation and deployment of applications 140A-D and 144A-D, respectively, as will be described in further detail below.

Domain administration server 150 may run on a separate hardware system with one or more independent processors, memory, network interfaces and power supplies, similar to nodes 120A-B. Domain administration server may further be connected to nodes 120A-B and servers 130A-D via one or more network connections. In other embodiments, domain administration server 150 may be implemented on the same node as one of the servers of the cluster 100. Domain administration server 150 may be operable to execute a method for deploying one or more application instances and/or configurations onto servers 130A-D, as will be described below in further detail.

Domain administration server 150 may manage central repository 152. Central repository 152 may be operable to store one or more applications 140 and 144 and configuration files 142 and 146. Each application 140 and 144 may correspond to a compiled and assembled copy of an application instance 140A-D or 144A-D on servers 130A-D. Likewise, configuration files 142 and 146 may be pre-deployment versions of configuration files 142A-D and 146A-D, as will be described in further detail below.

In one embodiment, domain administration server 150 may be used as a central point of configuration and deployment for one or more application server clusters 100. Specifically, domain administration server 150 may be operable to compile one or more applications, store the one or more applications in central repository 152, deploy the one or more applications onto servers 130A-D, and manage and update the configuration of the deployed applications, as will be described in further detail below.

It is noted that many of the details in FIG. 1 are purely illustrative, and that other embodiments are possible. For example, the number of load balancers 110, nodes 120, servers 130, applications 140 and 144 and configuration files 142 and 146 is purely illustrative. Application server cluster 100 may have any number of load balancers 110, nodes 120, servers 130, applications 140, 144 or configuration files 142 and 146. In some embodiments, load balancer 110 may be implemented on one or more of nodes 120A-B. Furthermore, in some embodiments each server 130A-D may be located on a separate node 120. In one embodiment, servers 130A-D on the same node 120A-B may share a single configuration file per application, while in other embodiments configuration files 142 and 146 may be stored only in central repository 152. It is further noted that in one embodiment, domain administration server 150 may be located on a node 120A-B along with one or more of servers 130A-D.

Figure 2:
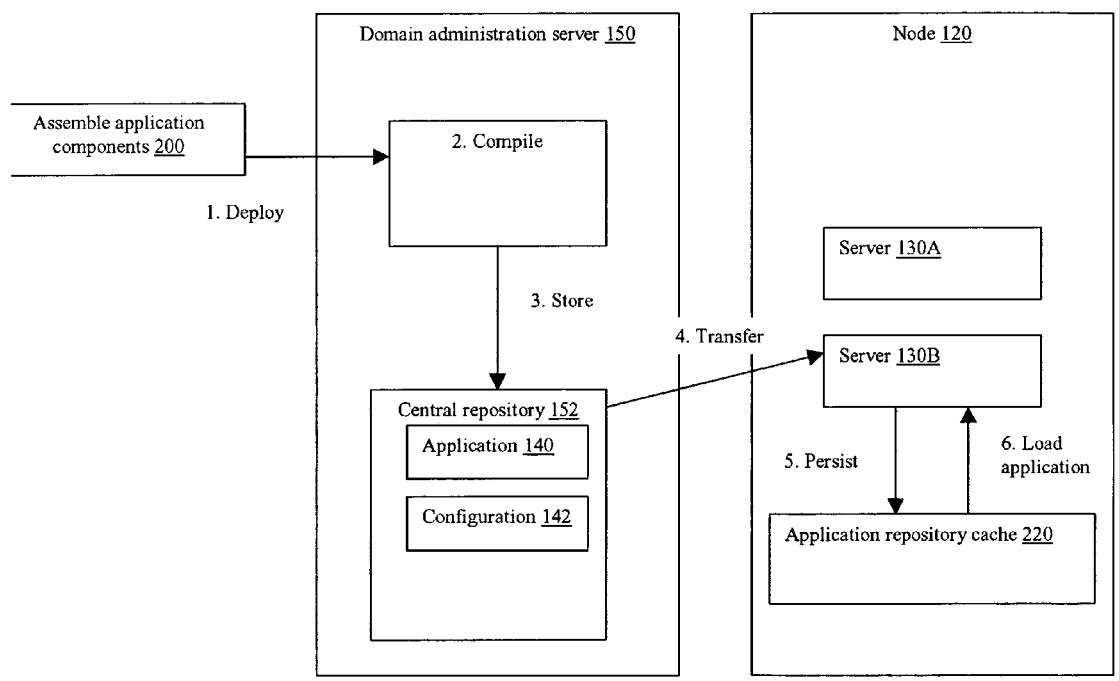
FIG. 2 is a block diagram illustrating one embodiment of a method for application deployment.

FIG. 2 is a block diagram illustrating phases associated with one embodiment of a method for phased application deployment for a cluster from a central domain. Referring collectively now to FIGS. 1-2, in 200 source code and associated components for an application are assembled. In one embodiment, the source code may be Java source files, whereas in another embodiment, the source code may be C or C++ source files or any other suitable programming language. In one embodiment the source code and associated components may be assembled into a directory structure, while in another embodiment the source code and associated components may be assembled into a single archive, such as a Java Archive (JAR) file. In one embodiment the archive may be a JSR88 compliant studio plug-in. Thus, application assembly may be an initial phase that is successfully complete before proceeding with application deployment.

The application may then be (1) deployed onto domain administration server 150 and (2) compiled on the server. Deployment may include loading the assembled application on domain administration server 150. Compilation may comprise compiling each individual source code file into an object and assembling all objects into an application, such as application 140, as described above. Compilation may further comprise generating code stubs, configuration files (e.g. configuration file 142), and other "hooks" necessary for an application to execute on a server cluster. It is noted that in one embodiment, the compiled application and associated resources may be grouped into a meta-application. In one embodiment, this meta-application may allow for easier administration of the application and associated resources as a single unit.

It is noted that in one embodiment, the application may be compiled prior to deployment on domain administration server 150, while in another embodiment, only the generation of code stubs and other hooks may take place on domain administration server 150. It is further noted that in some embodiments, the resulting compiled application may be tested to ensure proper deployment and execution on the server cluster as part of the compilation step, as will be described below.

The resulting application and associated configuration files may then be stored (3) in central repository 152. From central repository 152, applications and associated components may be deployed by domain administration server 150 onto one or more server clusters, as will be described below. It is noted that by deploying a single compiled and tested copy of an application from domain administration server 150 to one or more server clusters, deployment may be simplified. Specifically, an application may only have to be assembled and compiled once (to the central domain server), and then tested to ensure functionality and compatibility. Deploying only a single "known good" copy of an application may significantly simplify the deployment process by minimizing effort and errors, as will later be described in further detail. An application may deployed and tested on the domain administration server before the application is activated on the cluster.

The application and associated files may be transferred (4) to one or more servers in a node or server cluster from central repository 152 by domain administration server 150. In one embodiment, the application may be deployed individually on each server, while in another embodiment, the application may be deployed on all servers in a cluster substantially simultaneously. Once an application is on a server, the application may be persisted (5) to an application repository cache 220 in step 5. Application repository cache 220 may be contained in an individual server or node, and may be operable to store a local copy of an application. The application may then be associated or loaded (6) onto one or more servers, wherein it may be started and executed as described above.

It is noted that in one embodiment, the method described above in FIG. 2 may represent a phased deployment method comprising multiple phases. For example, the actions of FIG. 2 may be divided into four distinct phases: an assembly phase, a compilation phase, an association phase, and a start/stop phase. Specifically, assembling the application components in 200 may be part of the assembly phase, while actions 1-3 of FIG. 2 (deploying the archive, compiling the application, and storing the application) may be part of the compilation phase. The association phase may comprise actions 4 and 5 (transferring the application and persisting the application to application repository 220), and action 6 (starting and executing the application) may be part of the start/stop phase. The phased deployment controlled through the domain administration server allows each phase of application deployment to be completed successfully for the cluster before continuing to the next phase so that inconsistent deployment states within the cluster are avoided. The assembly and compilation phase need be performed only once to the domain administration server. From the domain administration server, the application may be associated with different servers of the cluster and started on the servers. The phased application deployment for the cluster may be controlled from the central domain administration server. As will be described below, these phases may represent different cycles of the deployment method described below in FIG. 3.

Figure 3:
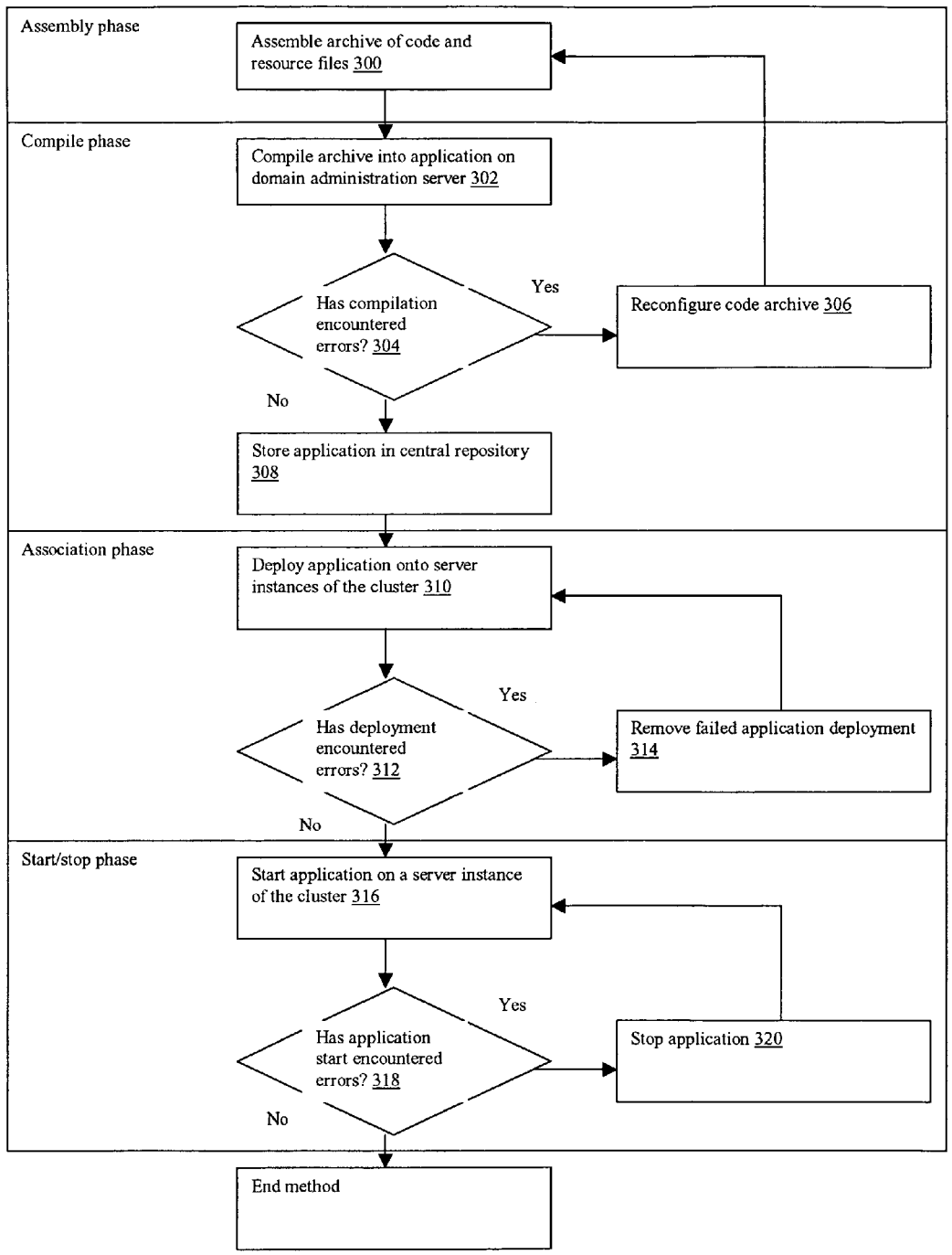
FIG. 3 is a flow diagram illustrating one embodiment of a method for application deployment.

Turning now to FIG. 3, a flow diagram illustrating one embodiment of a method for deploying an application from domain administration server 150 is shown. Referring collectively now to FIGS. 1-3, in 300 one or more source code files and associated resource files are assembled into an archive, as described above in FIG. 2. In 302 the application is compiled out of the components assembled in 300, as described above in FIG. 2. It is again noted that all or part of the compilation phase may occur on domain administration server 150.

In 304 the compilation process may be examined for any errors. In one embodiment, these errors may be the result of an error in the compilation process, such as a syntax error in the source code or a link error in the application assembly process, while in another embodiment, the resulting application may be tested to ensure functionality. If any errors are detected, the method may advance to 306, wherein the archive is reconfigured. Reconfiguring the archive may entail returning to the constituent source code files in 300 and correcting any syntax, programming or configuration errors, before returning again to 302.

Alternatively the method may advance to 308 if no errors are encountered during the compilation process. In 308 the resulting application may be stored in a central repository 152, as described above. It is noted that 300 may correspond to the assembly phase, as described above, while 302, 304, 306, and 308 may correspond to the compile phase.

In one embodiment, each phase may be associated with a distinct correction loop allowing any errors which may occur in that phase to be corrected prior to advancing to the next phase. For example, any compilation errors which occur in 302 may be corrected in 306. By correcting errors associated with each phase during that phase, errors which occur earlier in the deployment process may be eliminated before complicating the deployment process in a later step. Thus, the phased deployment maintains a consistent deployment state for an application among the various members of an application server cluster. It is noted that while the assembly and compilation phases of the method are shown to share a single correction loop in FIG. 3, 300 may have its own correction loop to ensure that all required code and resource files are present before advancing to 302.

In 310 the application and associated configuration files may be deployed on one or more servers or server clusters from central repository 152 by domain administration server 150. In one embodiment the deployment process may entail making server-specific changes to the application or associated configuration files. For example, different instances of an application executing on different servers of the same node may be configured to use different network ports to execute a communication process. It is further noted that in various embodiments, 310 may comprise different steps depending on the nature of the application being installed, as will be described below in FIGS. 5*a* and 5*b*.

In 312 the deployment may be examined for errors. For example, the application may be installed in a wrong directory on a server, or may be matched with incompatible configuration files. If deployment errors are detected, the application may be removed from the one or more servers in 314 and redeployed in 310 again with appropriate corrections to the deployment parameters by domain administration server 150. It is noted that 310, 312 and 314 may comprise the association phase of the method, as described above.

Alternatively, the deployment may not encounter errors. The method may then advance to 316, wherein the application may be started on one or more server instances in the server cluster by domain administration server 150. If the application does not start correctly in 318, appropriate corrective action such as stopping and restarting the application may be taken in 320 and 316, respectively. If the application does start correctly in 318, the method ends with the application installed and running properly on one or more servers in a server cluster. It is noted that 316, 318 and 320 may comprise the start/stop phase of the method, as described above.

It is further noted that, by combining a phased deployment method in which each phase is able to correct any errors that occur within the phase with a method in which a single known good copy of an application is deployed by a domain administration server 150, the deployment process is consistent throughout the cluster and the deployment process is made more robust. Furthermore, significant time savings may be achieved since multiple redundant compilation and deployment processes are eliminated.

Figure 4:
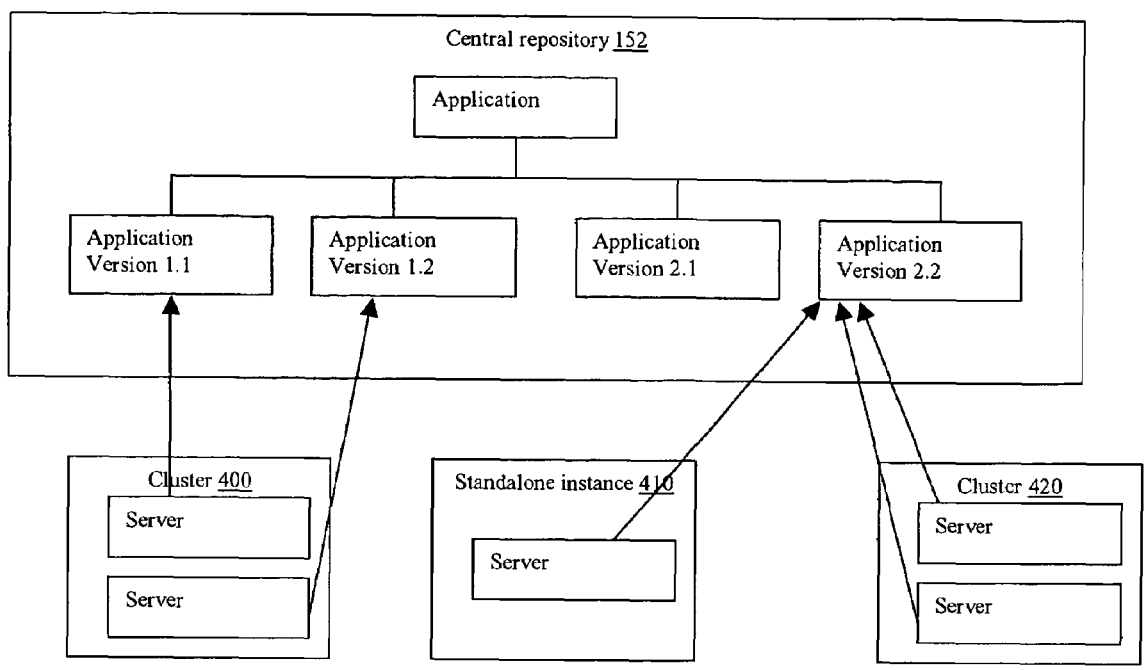
FIG. 4 is a block diagram illustrating one embodiment of application rollout.

In one embodiment of the method described in FIGS. 2 and 3, different versions of an application may be maintained and deployed by domain administration server 150 for a distributed system. For example, FIG. 4 is a block diagram illustrating how different versions of an application may be deployed on different server clusters in the association phase, as described above. As illustrated in FIG. 4, central depository 152 may contain multiple versions of the same application, each compiled and stored in domain administration server 150 at a different time. Each application may have different minor and major revisions which may effect compatibility. For example, version 1.1 and 1.2 of the application may represent a minor revision providing minor enhancement in the application, with no major changes to the application interface. Versions 1.1 and 1.2 may thus be able to operate as a clustered application when installed on different servers in a server cluster, and may share application data and provide fail-over service for each other.

Alternatively, versions 2.1 and 2.2 of the application may not be appropriate to operate in the same cluster with versions 1.1 and 1.2 of the application, due to modified or extended application interfaces, for example. Versions 2.1 and 2.2 may instead be interoperable with each other, but not with 1.1 or 1.2. Attempts for these major revisions of the application to execute on the same server cluster may lead to execution errors or noticeably different behavior to clients. In one embodiment, as illustrated in FIG. 4, each server cluster may execute only one major revision of the application. For example, one server in server cluster 400 may execute version 1.1 of the application, while another server in the same cluster executes version 1.2. Alternatively, standalone server instance 410 and all servers in server cluster 420 may each execute version 2.2 of the application. As will be described below, the ability for different application versions to successfully interact with each other may change the deployment process of 310 in FIG. 3. A single domain administration server may manage the different application versions for one or more clusters and/or servers.

Figure 5A:
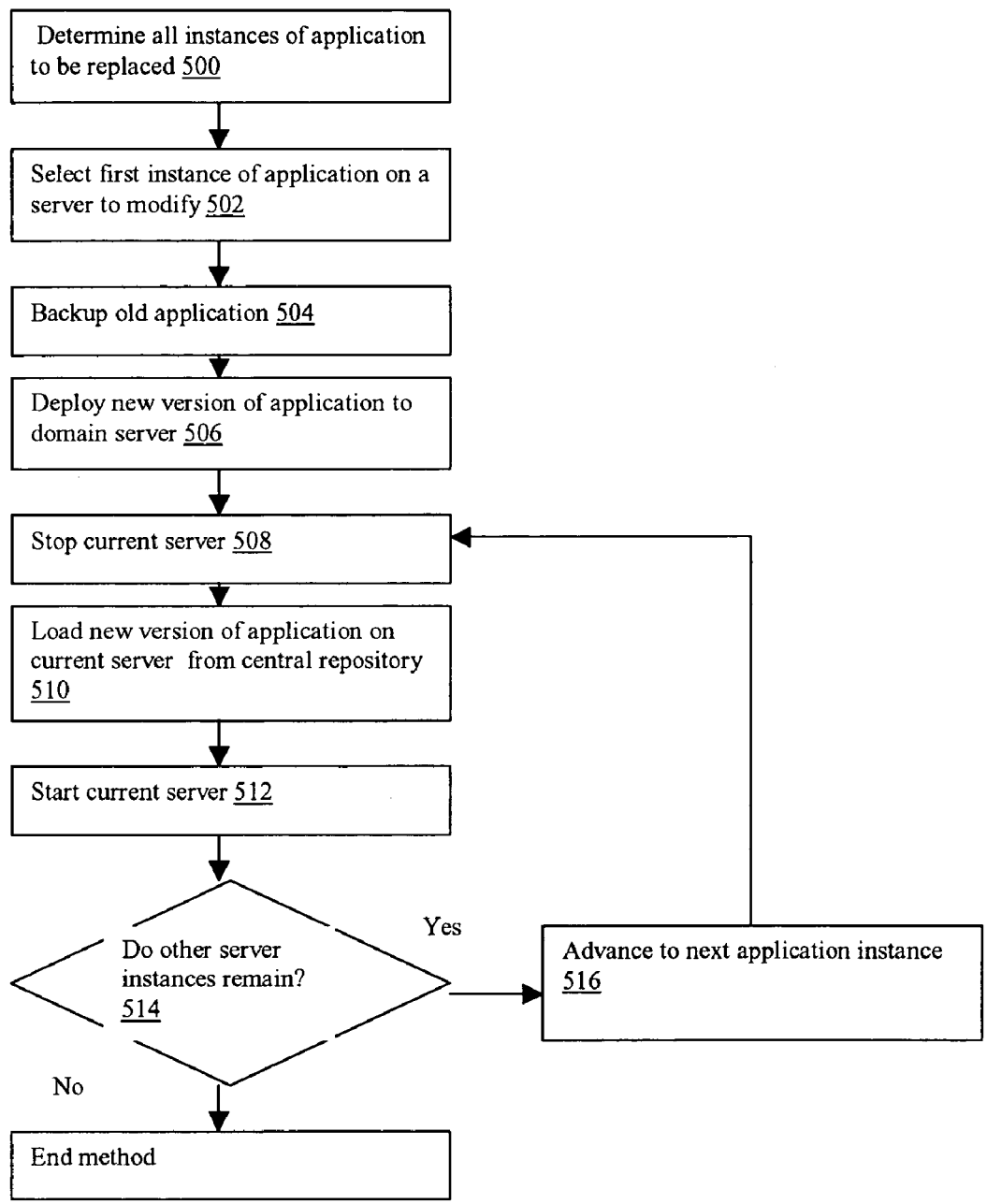
FIG. 5*a* is a flow diagram illustrating one embodiment of a method for application rollout in a mixed-mode.

FIG. 5*a* is a flow diagram illustrating one embodiment of a method for deploying an application in "mixed mode" onto a server cluster. As described above, different servers in a server cluster may be able to execute application instances that differ by minor revisions, such that an identification number used to identify a specific application instance may not change. Accordingly, as will be described below, a minor application revision may be deployed on a server cluster without shutting down the entire server cluster, thereby allowing for increased availability. In one embodiment, this method may be controlled by domain administration server 150.

In 500, the method determines all instances of the application to be replaced on the server cluster. It is noted that in various embodiments, one or more copies of an older revision of the application may be left on the server cluster for fail-over purposes. In one embodiment, the method may determine that the application to be replaced already exists on the server prior to beginning the method. In 502, the method selects a first instance from the selected application instances to modify.

In 504, the selected instance of the application is backed up for rollback purposes, so that the previous revision of the application may be restored in case of deployment error. In one embodiment the application may be backed up to application repository cache 220, while in another embodiment the application may be backed up to central repository 152. It is noted that in various embodiments 504 may be skipped, since the application may already exist in storage from a previous installation, in accordance with the method of FIG. 3.

In 506 the application is deployed to central repository 152 of the domain administration server, as described above in FIG. 3. In 508 the selected instance is stopped on the selected server. In one embodiment, stopping the selected instance may involve notifying load balancer 110 to halt any additional client requests to the stopped application instance. In one embodiment the application instance may have been inactive at the beginning of the method, in which case 508 may be skipped.

In 510 the method deploys the new version of the application onto the selected server from central repository 152. In one embodiment, the new version of the application may be associated with the selected server by registering the application with one or more locations within the server and domain administration server 150. The new application instance is then started in 512. As described above, in one embodiment the application instance may have been inactive at the beginning of the method, in which case 512 may be skipped.

In 514 the method determines if additional application instances remain to be replaced. If additional instances do remain to be replaced, the method moves to the next application instance to be replaced in 516 and returns to 508. Alternatively, if no instances remain to be replaced, the method ends. In one embodiment the method may be followed by a cleanup phase to remove any temporary backup copies made in 504. In one embodiment the method may additionally change various configuration information to indicate whether the cluster is operating in mixed mode (multiple application versions) or non-mixed mode (single application version). The mixed mode application deployment method allows a new application version to be deployed from the central domain administration server and started on particular servers in the cluster while a different version of the application remains running on other servers in the cluster. In this manner the cluster may be transitioned to a new application version. Also, under the control of the domain administration server, a new application version may be "tried out" on a limited number of servers in the cluster before being fully deployed to the entire cluster.

It is again noted that by individually stopping and reloading servers in a server cluster, the cluster remains available to service client requests, thereby allowing greater system availability.

Figure 5B:
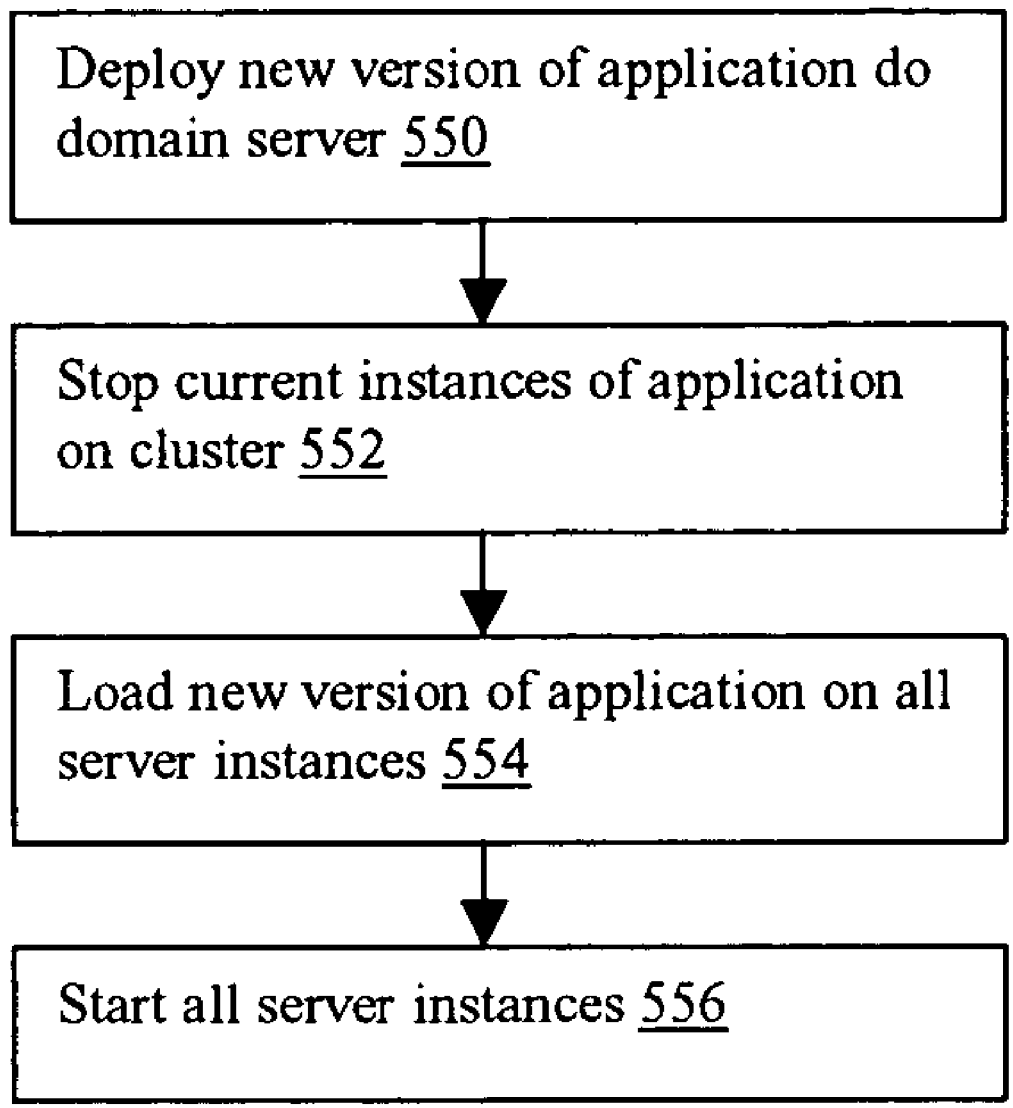
FIG. 5*b* is a flow diagram illustrating one embodiment of a method for application rollout in a non-mixed mode.

FIG. 5*b* is a flow diagram illustrating one embodiment of a method for deploying an application in non-mixed mode onto a server cluster. As described above, because major revisions in an application may break compatibility between instances, a server cluster may not be able to continue executing with different versions of an application on different servers in the cluster. For example, although a server may be operable to upgrade from version 1.1 to version 1.2 of FIG. 4 by using the mixed-mode method of FIG. 5*a*, the server may not be able to upgrade from version 1.2 to version 2.1 by using mixed mode. Accordingly, the non-mixed mode described below may be used.

In 550 a new version of the application is deployed to the central repository 152 of the domain administration server, as described above. It is noted that in various embodiments, the prior version of the application may be backed up or overwritten in 550. In 552 all server instances on the cluster are stopped, thereby ensuring that no application instance may communicate with an incompatible version. In one embodiment, stopping the server cluster may involve notifying load balancer 110 to halt any additional client requests to the stopped application instances.

In 554 each server in the cluster is loaded with the new version of the application from the central repository under control of the domain administration server. It is again noted that in one embodiment, the new version of the application may be associated with the selected server by registering the application with one or more locations within the server and domain administration server 150. In 556 each server in the cluster is restarted. It is noted that in various embodiments, each cluster may be started and stopped simultaneously, or one at a time. It is also again noted that by allowing each server to be upgraded with a major application revision at the same time from a known good configuration in the central repository, the chance of incorrect function or system failure due to incompatibility is removed. Once the new version of the application has been successfully associated with each server of the cluster, the cluster may be reactivated.

It is noted that the systems and methods described above in FIGS. 1-5*b* may provide an improved method for deploying and configuring application instances on one or more server clusters. Specifically, it is noted that by deploying a single compiled application to multiple server instances, the method of FIGS. 2 and 3 may decrease errors in the deployment process. Likewise, by allowing for different application versions to be rolled out on different clusters, the method of FIGS. 4, 5*a* and 5*b* may allow for a more robust set of servers.

Figure 6:
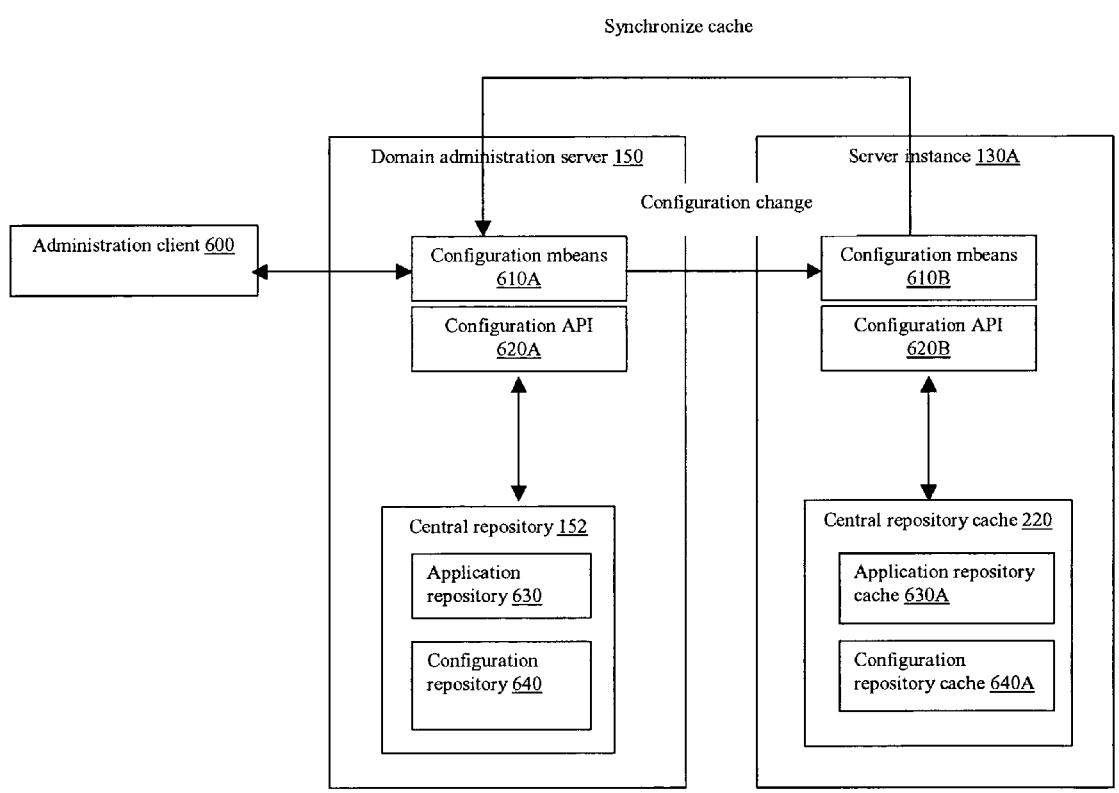
FIG. 6 is a block diagram illustrating another embodiment of a distributed system.

Turning now to FIG. 6, a block diagram of an exemplary domain administration server 150 and a cluster member server 130A is illustrated. As described above, domain administration server 150 is operable to control the deployment and configuration of one or more application instances on one or more servers 130. Specifically, domain administration server is coupled via a network to server instance 130A, and may execute or interact with administration client 600 to modify the configuration of one or more application instances, as will be described below.

Domain administration server 150 may maintain central repository 152, as described above. Central repository 152 may contain application repository 630, which may contain one or more applications and associated configuration files for each application. For example, in one embodiment application repository 630 may contain extended markup language (XML) configuration files which contain all the parameters needed to execute an associated application, such as IP address, server port, control parameters, cluster configuration, hardware configuration, or other parameters. Furthermore, as will be described in further detail below, in one embodiment configuration repository 640 may represent a group of server configuration files, each of which is associated with a specific type of server configuration such as hardware, application, or cluster configuration.

In one embodiment the configuration files within application repository 630 and configuration repository 640 may be directly editable by an end user using a text editing application, while in another embodiment the repositories may be edited by one or more programs. For example, in one embodiment domain administration server 150 may implement a configuration mbeans 610A and configuration API 620A. Configuration API 620A may be an application program interface to central repository 152 operable to modify the contents of central repository 152, including application repository 630 and configuration repository 640. Configuration mbeans 610A may be a set of management values and functions following the Java Management Extension (JMX) standard, operable to allow an administration client to modify configuration repository 640 in central repository 152, as will be described below. It is noted that in one embodiment, configuration mbeans 610A may be an abstract set of functions and values interoperable with a wide variety of external programs, while configuration API 620A may be a platform-specific set of functions operable primarily by configuration mbeans 610A.

In one embodiment, administration client 600 may be a command line interface (CLI) or graphical user interface (GUI) which executes on domain administration server 150. Alternatively, administration client 600 may execute on another computer and interact with domain administration server 150. Administration client 600 may be operable to modify one or more configuration files in central repository 152 by interacting with configuration mbeans 610A. For example, administration client 600 may be a GUI operable to display the various data fields and values of configuration files in configuration repository 640. An end user may change the value of a specific field in the GUI, causing administration client 600 to interact with configuration mbeans 610A, causing configuration mbeans 610A to modify a configuration file via configuration API 620.

Domain administration server 150 may be coupled to one or more servers 130 executing on one or more nodes 120, as described above. Specifically, in one embodiment domain administration server 150 may be coupled to a server 130A. Server 130A may contain configuration mbeans 610B and a configuration API 620B similar to components 610A and 620A, as described above. Server 130A may also contain a central repository cache 220. Central repository cache 220 may be operable to contain local versions of one or more applications and associated configuration files, stored in application repository cache 630A and configuration repository cache 640A. It is noted that in various embodiments, central repository cache 220 may provide for more efficient data retrieval by providing a locally cached copy of one or more applications and configuration files to server 130A. Central repository cache 220 may also advantageously provide for a more highly available system by making applications and configuration files available to server 130A during periods when central repository 152 is unavailable.

As will be described below, in one embodiment application repository cache 630A and configuration repository cache 640A may be substantially similar to application repository 630 and configuration repository 640, while in another embodiment, application repository cache 630A and configuration repository cache 640A may be substantially different from application repository 630 and configuration repository 640. Specifically, domain administration server 150 may be operable to execute a method allowing for the establishment of a configuration model residing in central repository 152. This model may then be associated with one or more repository caches such as 630A and 640A. In one embodiment, domain administration server 152 acting in accordance with administrative client 600 may be operable to modify the configuration associated with one or more specific application instances, as will be described in further detail below. In one embodiment, configuration changes from domain administration server 150 may be propagated to a server in response to an update of a configuration file in central repository 152, while in another embodiment, changes from domain administration server 150 may be propagated to a server in response to a restart of an application instance.

Figure 7:
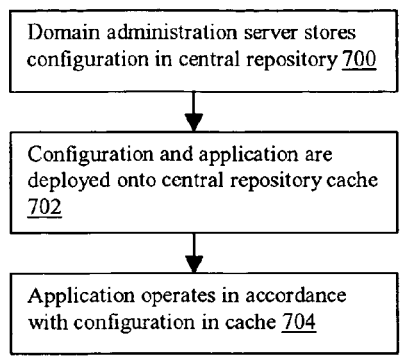
FIG. 7 is a flow diagram illustrating one embodiment of a method for deploying configuration information.

FIG. 7 is a flow diagram illustrating one embodiment of a method for deploying an application and configuration onto a server instance, as described above. Referring collectively now to FIGS. 1-6, in 700 domain administration server 150 stores configuration information in central repository 152. As described above, this configuration information may be stored in configuration repository 630, and may be manually edited by an end user or edited with administration client 600 via configuration mbeans 610A and configuration API 620A. In one embodiment, the configuration information may provide a base model for the configuration of all instances of an application on one or more server clusters.

In 702 the configuration information and associated application are deployed from central repository 152 to a central repository cache 220 by domain administration server 150. In one embodiment, domain administration server 150 may retrieve the configuration information from central repository 150 and install the configuration information on central repository cache 220 by interacting with configuration mbeans 610A and 610B, respectively.

As described above, domain administration server 150 may be operable to make one or more changes to a deployed configuration file. For example, domain administration server 150 may install a configuration file on two servers executing on the same node. Each server may be running an application instance that requires a unique network port. Accordingly, when installing the configuration model on one of the servers, domain administration server 150 may modify the network port parameter in the configuration file stored in central repository cache 220. In 704 the application instance acts in accordance with the associated configuration file, as described above.

It is noted that in one embodiment, the system and method described above in FIGS. 6 and 7 may provide for a configuration template applicable to multiple different types of hardware. For example, a vendor may provide a partial configuration file 142 with name-pair values specific to that hardware platform already filled out. The user may then be able fill in the application and installation specific parameters such as IP address without having to concern themselves unduly with hardware-specific settings. Likewise, the system and method described above may provide the ability to run multiple servers off of a single common configuration, which may be a "known good" configuration, thereby minimizing the effort needed to configure a system. It is noted that in one embodiment, one or more configurations may be stored in central repository 152 without being associated with a specific server instance. This may provide end users with the ability to store one or more alternate configurations and associate those alternate configurations with a specific application or server instance as needed.

Figure 8A:
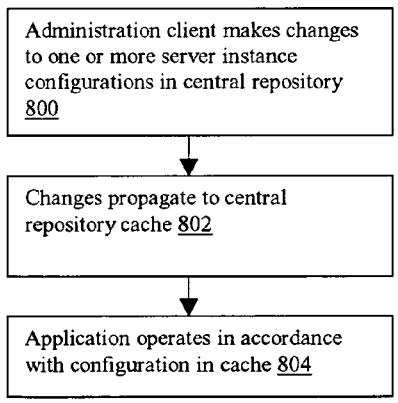
FIG. 8*a* is a flow diagram illustrating one embodiment of a method for deploying configuration information from a central repository.

Turning now to FIG. 8a, a flow diagram illustrating one embodiment of a method for propagating a configuration change to one or more server instances is shown. In 800 a configuration file may be modified by an end user or by application client 600, as described above. It is noted that in one embodiment the change may comprise a name-value pair, wherein the name represents the data field in the configuration file to be changed, and the value represents the new configuration value which may override the old configuration value. In one embodiment the name-value pair may represent an xpath expression, and in a further embodiment, the central repository 152 may maintain a file listing all overriding xpath expressions for later retrieval, as will be described below.

It is further noted that in one embodiment administrative client 600 may be operable to allow an end user to modify one or more name-value pairs for one or more specific application instances, one or more clusters, or any other group of servers. In one embodiment any name-value pairs not specifically overridden may remain the same between central repository 152 and central repository cache 220.

In 802 the changed value may be propagated to central repository cache 220 by domain administration server 150, as described above. In one embodiment cached configuration repository cache 640A may be directly modified with the overridden variable, while in another embodiment central repository cache 220 may maintain a separate file of all xpath expressions which override the values in cached configuration repository 640A. It is noted that in one embodiment, an application instance may read the cached configuration file and any overriding configuration changes from central repository cache 220 at startup, as will be described below. In 804 the application instances operates in accordance with the cached configuration, as described above.

Figure 8B:
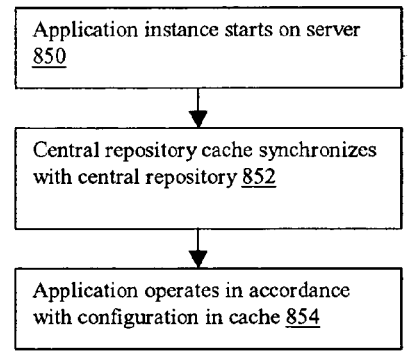
FIG. 8*b* is a flow diagram illustrating one embodiment of a method for synchronizing a central repository cache.

Turning now to FIG. 8b, a flow diagram illustrating one embodiment of a method for synchronizing central repository cache 220 with central repository 152 is shown. In 850 an application instance starts or is restarted on a server. In one embodiment, the application instance may immediately read the cached configuration file from central repository cache 220 upon startup, while in another embodiment the application may wait for the rest of the method to complete before reading the configuration information. It is noted that in one embodiment an application instance may read the cached configuration file if central repository 152 is unavailable.

In 852 central repository cache 220 synchronizes with central repository 152. In one embodiment server 130A may utilize configuration mbeans 610A and 610B to read overriding xpath expressions from central repository 152 and store the xpath expressions in central repository cache 220, as described above. It is again noted that in one embodiment, an application instance may read the updated configuration information after the synchronization is complete. In 854 the application instance operates in accordance with the cached configuration, as described above.

Figure 9:
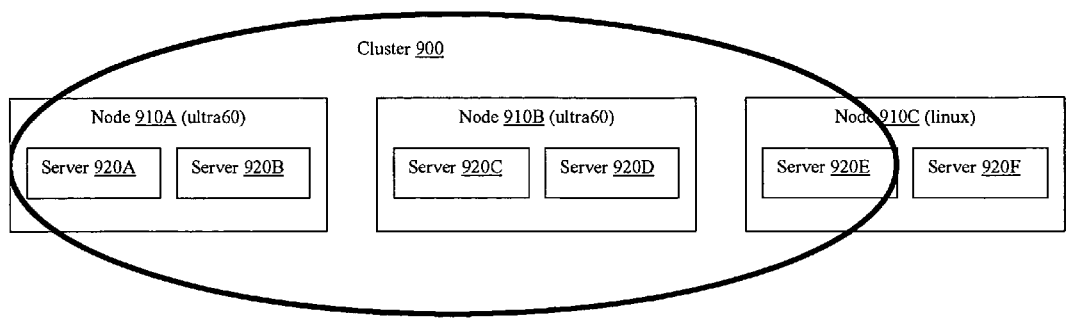
FIG. 9 is a block diagram illustrating one embodiment of a server cluster and standalone server instance.

Turning now to FIG. 9, a block diagram of an exemplary organization of clusters and servers is illustrated. As shown in FIG. 9, cluster 900 may contain a plurality of servers 920A-E on a plurality of nodes 910A-C. It is noted that nodes 910A and B may be one type of platform, such as Sun Solaris running on an Ultra 60 processor, while node 910C may be another type of platform, such as Linux running on an x86 processor. In one embodiment all the servers 920A-E in cluster 900 may be executing one application, while standalone server 920F may execute a second application, as will be described below.

Figure 10:
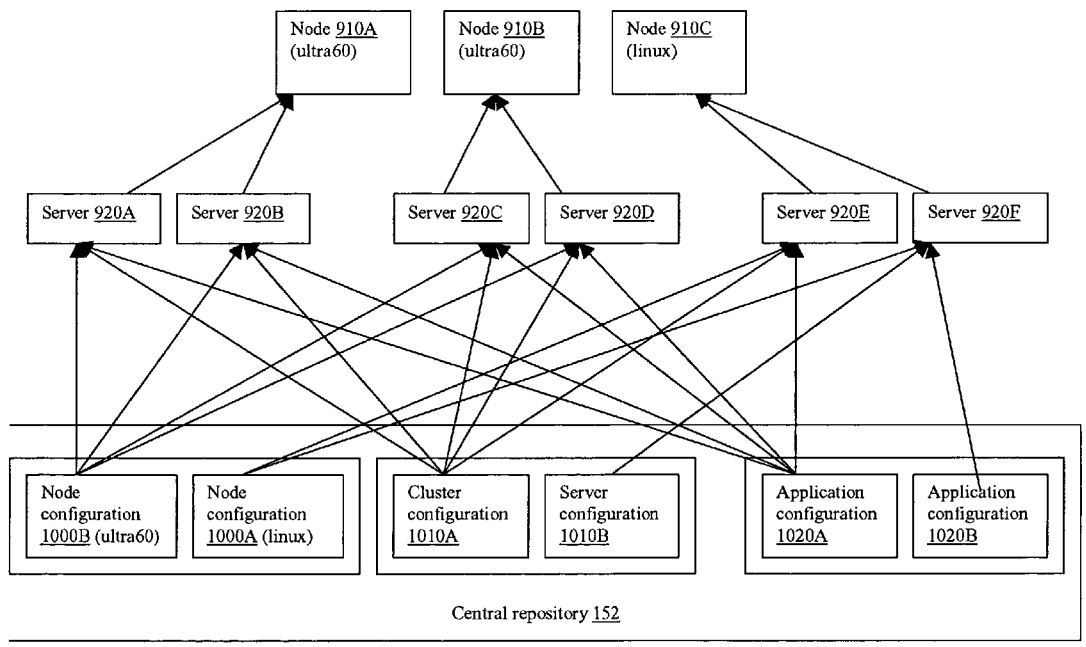
FIG. 10 is a block diagram illustrating one embodiment of configuration association.

FIG. 10 is a block diagram illustrating how various types of configurations may be associated with a plurality of server instances. As described above, configuration repository 640 may comprise a plurality of configuration files, each of which represents a different type of configuration, such as hardware, software, or cluster configuration. It is noted that in one embodiment, each configuration file may be stored in central repository 152, and may be associated.

For example, the set of nodes 910A-C and servers 920A-F illustrated in FIG. 9 may be associated with two hardware configurations, 1000A and 1000B. 1000A may contain configuration information applicable to executing a server instance 920 on an Ultra 60 processor, while 1000B may contain configuration information applicable to executing a server instance 920 on an x86 processor executing Linux. Accordingly configuration 1000A may be associated with or loaded on all servers 920A-D executing on Ultra 60 nodes 910A and 910B, while configuration 1000B may be associated with servers 920E-F, which execute on a Linux platform.

Likewise, cluster configuration 1010A may contain information for all servers 920A-E executing in cluster 900, while server configuration 1010B may contain information for standalone server instance 920F. Application configuration 1020A may be applicable to servers 920A-E executing a first application, as described above, while application configuration 1020B may be applicable to server 920F executing a second application. It is noted that all servers in a common cluster may contain instances of the same application, so servers 920A-E may each be associated with the same application configuration 1020A and cluster configuration 1010A, whereas standalone server 920F may be the only server associated with application configuration 1020B and server configuration 1010B. It is further noted that the configuration system as described above may allow for various types of servers to be associated with the appropriate configuration information files.

It is noted that the systems and methods described above in FIGS. 6-10 may provide an improved method for deploying and configuring application instances on one or more server clusters. By allowing a model configuration with instance-specific modifications to be deployed to multiple server instances, the configuration deployment method of FIGS. 7, 8a, and 8b may further allow for a simplified mechanism for configuration management, and the ability to more easily manage a variety of hardware and software configurations from a central location. Specifically, by templatizing one or more configuration files, support for different server and blade systems may be more easily provided. In addition, various operations may be performed on arbitrary groups of servers, or without any specific server target.

Figure 11:
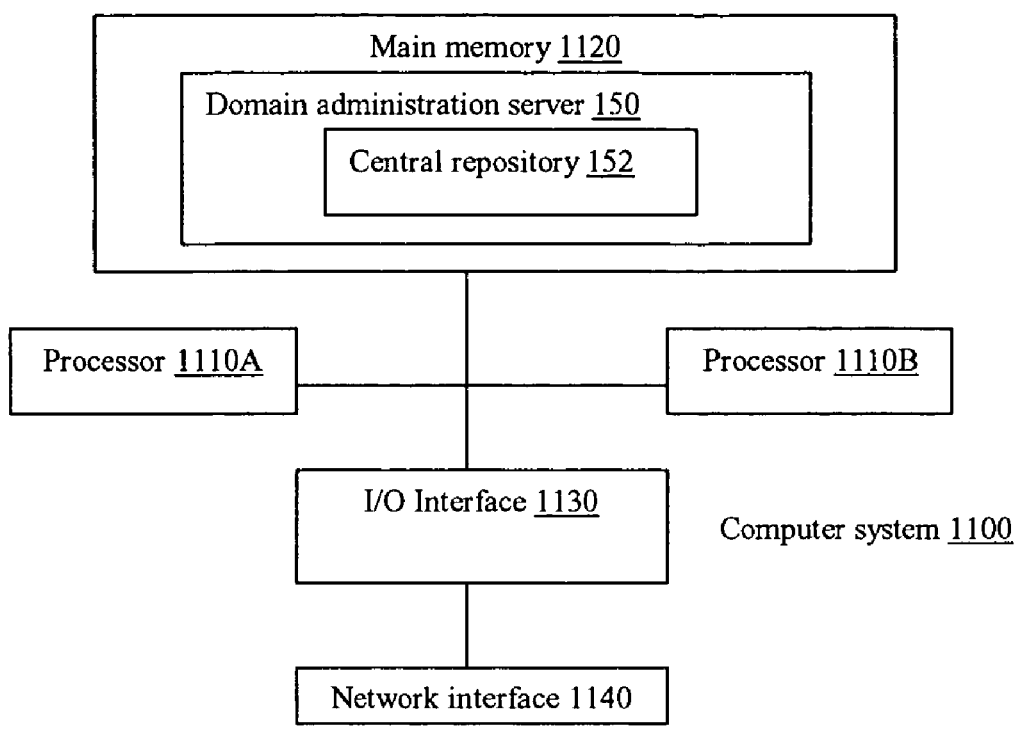
FIG. 11 illustrates an exemplary computer subsystem for implementing application deployment, according to one embodiment.

Turning now to FIG. 11, an exemplary computer subsystem 1100 is shown. Computer subsystem 1100 includes main memory 1120, which is coupled to multiple processors 1110A-B, and I/O interface 1130. It is noted that the number of processors is purely illustrative, and that one or more processors may be resident on the node. I/O interface 1130 further connects to network interface 1140. Such a system is exemplary of a load balancer, a server in a cluster or any other kind of computing node in a distributed system. Such a system may also be exemplary of nodes 120A-B, as described in FIG. 1.

Processors 1110A-B may be representative of any of various types of processors such as an x86 processor, a PowerPC processor or a CPU from the SPARC family of RISC processors. Likewise, main memory 620 may be representative of any of various types of memory, including DRAM, SRAM, EDO RAM, DDR SDRAM, Rambus RAM, etc., or a non-volatile memory such as a magnetic media, e.g., a hard drive, or optical storage. It is noted that in other embodiments, main memory 600 may include other types of suitable memory as well, or combinations of the memories mentioned above.

As described in detail above in conjunction with FIGS. 1-10, processors 1110A-B of computer subsystem 1100 may execute software configured to execute a method for deploying an application on a server cluster. The software may be stored in memory 1120 of computer subsystem 1100 in the form of instructions and/or data that implement the operations described above.

For example, FIG. 11 illustrates server 130A and an application stored in main memory 1120. The instructions and/or data that comprise domain administration server 150 and central repository 152 may be executed on one or more of processors 1110A-B, thereby implementing the various functionalities of domain administration server 150 and central repository 152 as described above.

In addition, other components not pictured such as a display, keyboard, mouse, or trackball, for example may be added to computer subsystem 1100. These additions would make computer subsystem 1100 exemplary of a wide variety of computer systems, such as a laptop, desktop, or workstation, any of which could be used in place of computer subsystem 1100.

Various embodiments may further include receiving, sending or storing instructions and/or data that implement the operations described above in conjunction with FIGS. 1-10 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    assembling files for an application;
    compiling the files into an application on an administration server, wherein the administration server is coupled to a central application repository;
    storing the application in the central application repository;
    after successfully compiling the application on the administration server, deploying the application from the central application repository onto a plurality of servers in a cluster of servers;
    starting the application on the plurality of servers;
    storing a different version of the application in the central application repository;
    deploying the different version of the application from the central application repository onto a plurality of servers in the cluster of servers, wherein the application and the different version of the application simultaneously execute on different servers in the cluster of servers; and
    starting an older version of the application on a subset of servers such that the older version and a current version of the application simultaneously execute on different servers in the cluster of servers.

2. The method of claim 1, wherein said assembling comprises assembling the files into a single archive file.

3. The method of claim 1, wherein said files comprise a set of source code and related resource files for the application, the method further comprising validating that said compiling the files into the application has been performed without errors, wherein said validating is performed prior to performing said deploying the application to any of the plurality of servers in the cluster.

4. The method of claim 1, wherein deploying the different version of the application comprises:
    stopping an instance of the application on a server;
    loading the different version of the application on the server;
    associating the instance of the application with the different version of the application on the server;
    starting the instance of the different version of the application on the server.

5. A system comprising:
    files for an application;
    a plurality of servers in a cluster of servers;
    an administration server connected to the cluster of servers, wherein the administration server for the cluster of servers is operable to:
        compile the files into an application;
        store the application in a central application repository connected to the administration server operable to store the application; and
        after successfully compiling the application on the administration server, deploy the application from the central application repository onto the plurality of servers in the cluster;
    wherein the plurality of servers are operable to start the application;
    wherein the central application repository is operable to store a different version of the application;
    wherein the administration server is operable to deploy the different version of the application onto a plurality of servers in the cluster of servers; and wherein the plurality of servers are operable to simultaneously execute the application and the different version of the application.

6. The system of claim 5, wherein the files are assembled in a single archive file.

7. The system of claim 5, wherein said files comprise a set of source code and related resource files for the application, and wherein the administration server is further operable to validate that the application has been compiled without errors prior to the application being deployed to any of the plurality of servers in the cluster.

8. The system of claim 5, wherein the administration server is further operable to:
   stop an instance of the application on a server;
   load the different version of the application on the server;
   associate the instance of the application with the different version of the application on the server;
   start the instance of the different version of the application on the server.

9. A computer-readable storage medium storing program instructions computer-executable to implement a method comprising:
   assembling files for an application;
   compiling the files into an application on an administration server, wherein the administration server is coupled to a central application repository;
   storing the application in the central application repository;
   after successfully compiling the application on the administration server, deploying the application from the central application repository onto a plurality of servers in a cluster of servers;
   starting the application on the plurality of servers;
   storing a different version of the application in the central application repository;
   deploying the different version of the application onto a plurality of servers in the cluster of servers, wherein the application and the different version of the application simultaneously execute on different servers in the cluster of servers; and
   starting an older version of the application on a subset of servers such that the older version and a current version of the application simultaneously execute on different servers in the cluster of servers.

10. The computer-readable storage medium of claim 9, wherein said assembling comprises assembling the files into a single archive file.

11. The computer-readable storage medium of claim 9, wherein said files comprise a set of source code and related resource files for the application, and wherein the method further comprises validating that said compiling the files into the application has been performed without errors, wherein said validating is performed prior to performing said deploying the application to any of the plurality of servers in the cluster.

12. The computer-readable storage medium of claim 9, wherein deploying the different version of the application comprises:
   stopping an instance of the application on a server;
   loading the different version of the application on the server;
   associating the instance of the application with the different version of the application on the server;
   starting the instance of the different version of the application on the server.

* * * * *